Figure 1:
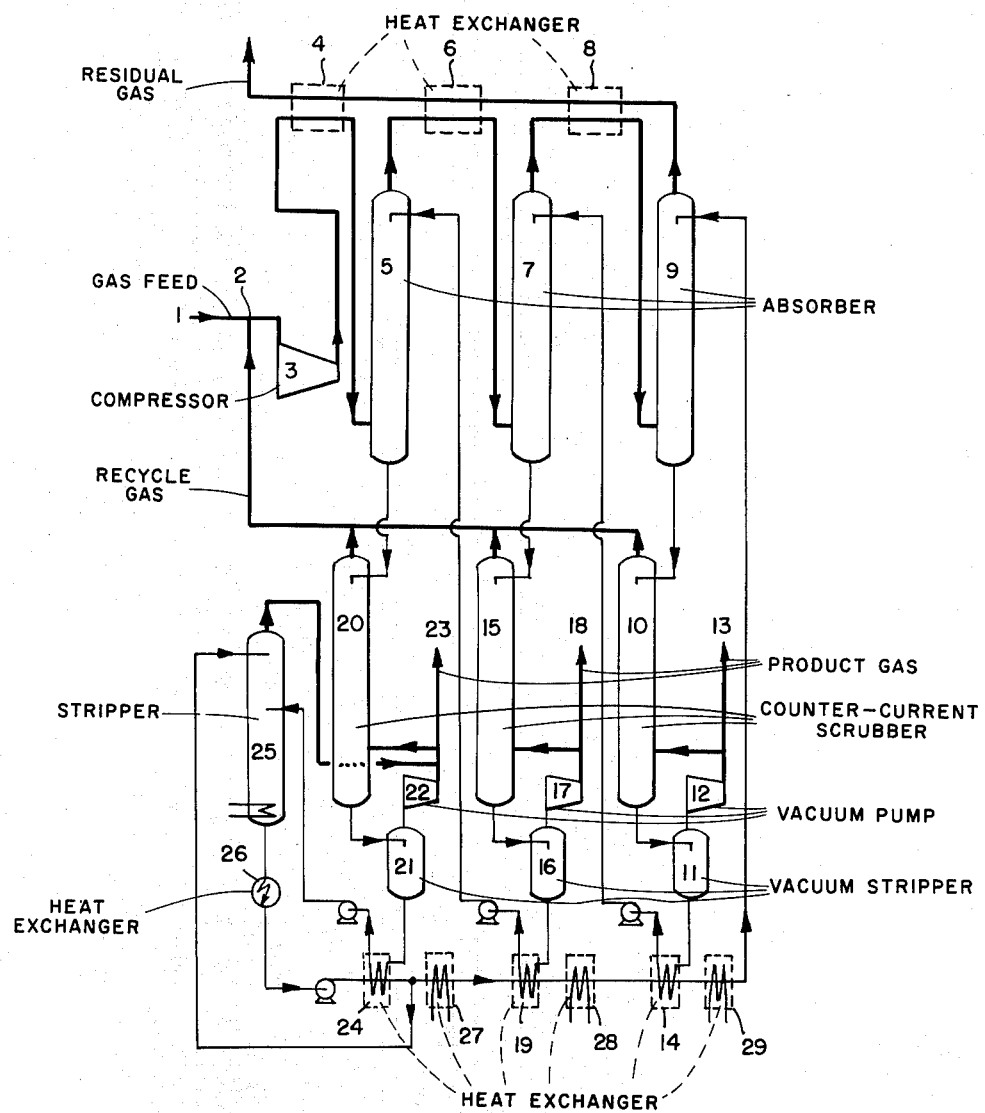

INVENTORS:
LOTHAR LORENZ
MICHAEL SCHUNCK
BY *Marzall Johnston Cook & Root*
ATT'YS

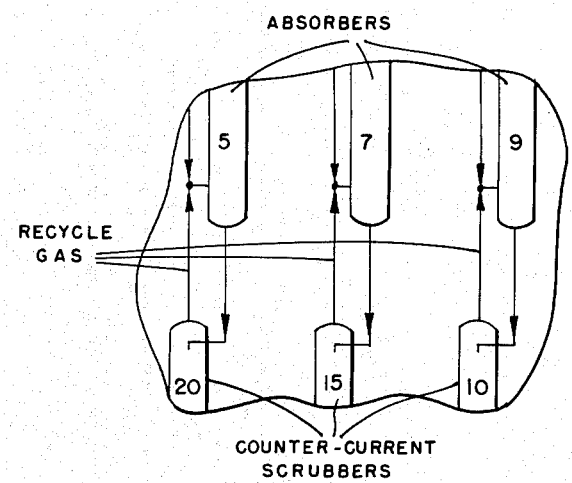

United States Patent Office 3,232,027
Patented Feb. 1, 1966

1

3,232,027
SEPARATION AND RECOVERY OF COMPONENTS FROM GAS MIXTURES
Lothar Lorenz, Heidelberg, and Michael Schunck, Ludwigshafen (Rhine), Germany, assignors to Badische Anilin- & Soda-Fabrik Aktiengesellschaft, Ludwigshafen (Rhine), Germany
Filed Oct. 3, 1962, Ser. No. 228,084
Claims priority, application Germany, Oct. 4, 1961, B 64,224
6 Claims. (Cl. 55—44)

This invention relates to a process for the separation and recovery of components from gas mixtures.

In the various processes for cracking hydrocarbons, mixtures of unsaturated gaseous compounds are generally formed, and the desired components have to be recovered by means of special separation techniques.

The separation of gas mixtures by distillation at elevated pressures or low temperatures is already known. In many cases, however, a distillation under the conditions described is not possible. For example, acetylene and ethylene cannot be separated from one another by distillation because of the particular properties of acetylene, while in the case of $C_4$ olefines the separation of the individual components by means of distillation is extremely difficult because the boiling points are too close to one another. In these cases, the separation of the individual components can be brought about by combining two or more methods. For example, acetylene and ethylene can be obtained in a pure state from a gaseous mixture if the acetylene is first absorbed in a selective solvent and the ethylene then recovered from the residual gas by distillation. A similar method is used for recovering butadiene and butylenes from gaseous mixtures containing these components. Such combinations of different processing steps involve considerable investment costs on account of the different types of equipment required, and a large number of personnel; in addition, the consumption of energy is comparatively high.

Several components can be separated out of, and recovered from, the aforementioned and similar mixtures by absorption processes in which several solvents are employed, or the same solvent is employed in several circulation systems. Here again, however, the expenditure for equipment and energy is comparatively high. Because of the uniformity of the plant used here, however, investment costs and personnel requirements are lower than in the case of combined absorption and distillation processes.

It is an object of the present invention to provide a process for the separation and recovery of components from gas mixtures by fractional absorption in a solvent and subsequent fractional desorption, by which the aforementioned difficulties are avoided.

Other objects and advantages will become apparent from the following detailed description.

These and other objects and advantages of the invention are achieved by passing the solvent within a closed circuit through an absorption zone and a desorption zone, arranged after the same, for each component to be separated and recovered, in such a way that the regenerated solvent is introduced into the absorption zone for the most difficultly soluble component, passed through the desorption zone connected thereto, partially stripped by

2 reducing the pressure, introduced into the absorption zone for the next most readily soluble component and, after leaving the desorption zone for the most readily soluble component and before being recycled into the absorption zone for the most difficultly soluble component, is completely stripped, the temperature and pressure in the absorption zones being so chosen that the component to be separated is just completely absorbed in the circulating solvent.

The process according to the invention will now be described in greater detail with reference to FIGS. 1 and 2 of the accompanying drawing in which an apparatus comprising 3 absorption and desorption zones for the separation and recovery of 3 components from a gas mixture is shown schematically by way of example:

The gas feed entering at 1 which contains, in addition to the components to be separated A, B and C, further gases, e.g., inert gases, referred to herein, as residual gas, is mixed at 2 with a recycle gas to be described below, and then compressed in compressor 3. The compressed gas mixture is cooled in heat exchanger 4, if desired with cold residual gas leaving the process, and then enters absorber 5 in the first absorption stage, where the most readily soluble component A is completely scrubbed out at a temperature $t_A$ and a pressure $p_A$ with the solvent, which at this point already contains a certain quantity of component B.

The unabsorbed portion of the gas leaves absorber 5, is further cooled in heat exchanger 6, if desired with cold residual gas, and then enters absorber 7 of the second absorption stage. Here, gas B, as the next most readily soluble component, is completely scrubbed out at a temperature $t_B$ ($t_B$ is less than $t_A$ if the partial pressure of component B in absorber 7 is not higher than that of component A in absorber 5) and at the pressure $p_B$, with the solvent which at this point already contains a certain quantity of component C.

The unabsorbed gas, which now contains only component C and residual gas, leaves absorber 7, is further cooled in heat exchanger 8, if desired with cold residual gas, and then enters absorber 9 of the third, and in this case, the last absorption stage. Here, component C is washed out at a temperature $t_C$ (in general $t_C$ is less than $t_B$), and at a pressure $p_C$ by means of a solvent which has been previously completely stripped. The residual gas leaving absorber 9 has practically the same temperature as that of the solvent used in this stage, and serves, as described above, to cool down the gas passing through heat exchangers 8, 6 and 4 into the adjoining absorption columns.

The solution leaves absorber 9, and is freed of residual gas unavoidably dissolved together with component C, by means of countercurrent scrubber 10. The gas from countercurrent scrubber 10 ("recycle gas") is, together with the gases from countercurrent scrubbers 15 and 20 which are employed in analogous operations, mixed at 2 with fresh feed gas and recycled into the process as shown in FIG. 1. Alternatively, the "recycle gas" from each of the countercurrent scrubbers 10, 15 and 20 can be recycled back from each scrubber directly to the gas inlet of its associated absorber, as shown in FIG. 2, wherein only the absorbers and countercurrent scrubbers are illustrated, the flow sheet otherwise being identical to FIG. 1. The solution leaving countercurrent scrubber 10 is led into the vacuum stripper 11, where component C is desorbed as a result of the pressure drop. The desorbed gas is then compressed in compressor 12 to the same pressure as that existing in countercurrent scrubber 10, and from here some of it is returned to the countercurrent scrubber, while the remainder is withdrawn through line 13 as product. The amount of product drawn off here is more or less the same as that of the feed gas introduced at 1. There is a small loss of approximately 1%.

The solvent which still contains some component C according to the pressure and temperature in the vacuum stripper 11 flows from there through heat exchanger 14, in which it is heated by the completely stripped solvent, to absorber 7 where it is used for scrubbing component B at temperature $t_B$. The solvent flows from absorber 7 into the countercurrent scrubber 15, where it is freed of component C and residual gas which has been dissolved together with component B. In vacuum stripper 16 the bulk of component B is desorbed as a result of the pressure drop, and after compression in compressor 17, some of it is led back to countercurrent scrubber 15, while the remainder can be withdrawn through line 18 as product B.

The solvent, which still contains some component B according to the pressure and temperature in the vacuum stripper 16 is passed, in a manner similar to that described above, through heat exchanger 19, absorber 5, countercurrent scrubber 20 and vacuum stripper 21. After compressing in vacuum compressor 22, that quantity of component A obtained by partial stripping in vacuum stripper 21 is mixed with component A from stripper 25, and some of it is led to countercurrent scrubber 20, while the remainder can be withdrawn as product A.

The solvent which on leaving the vacuum stripper 21 still contains some component A, is employed in a further heat exchanger 24 for cooling the stripped solvent, and is then led into a steam-heated stripper 25 where it is completely degassed in known manner, by evaporating part of the solvent.

The upward rising gas-solvent vapor mixture liberated in stripper 25, is freed of solvent vapor in the upper part of the stripper by means of cold solvent flowing in countercurrent. The gas, which consists of pure component A, is mixed in the manner described above with the component A coming out of the vacuum compressor 22.

The temperature of the warm solvent flowing out of stripper 25 is lowered by passing the solvent through the water cooled heat exchanger 26, and then further lowered to the temperature $t_C$ of the third absorption stage by passing the solvent through heat exchangers 24, 19 and 14. The additional heat exchangers 27, 28 and 29 are necessary to compensate for the heat leak due to irreversible effects.

The energy required to carry out the process according to the invention comprises the energy for compressing the gases, refrigeration, steam heating, and auxiliary machinery (pumps etc.), and is considerably less than that required in prior processes.

The process according to this invention lends itself to separating a great variety of different gas mixtures. It is especially suitable for the separation of gaseous hydrocarbons from gas mixtures. Moreover, it is suitable for the separation of inorganic gases, e.g., carbon dioxide and hydrogen sulfide from natural gas.

The solvent used for carrying out the process should have as high a solvency and selectivity for the components to be separated as possible.

The pressure and temperature in the individual separating stages, i.e., absorption and desorption units connected with each other, depend on the composition of the gas and the solubility of the components in the solvent chosen. They can be calculated on the basis of the above description by the conventional methods of absorption technology.

The invention will be further illustrated by, but is not limited to, the following examples.

Example 1

On recovering acetylene and ethylene from a cracked gas with the average composition

| | Acetylene | Carbon dioxide | Ethylene | Methane | Gases, inert |
|---|---|---|---|---|---|
| Components | A | B | C | Residual gas | |
| Volume percent | 8 | 4 | 8 | 6 | 74 | and employing acetone as the solvent, the following were the conditions existing at the individual stages:

Pressure in absorbers 5, 7 and 9: 15 atm. abs.
Pressure in scrubbers 10, 15 and 20: 1.2 atm. abs.
Temperatures: $t_A = +25°$ C., $t_B = -15°$ C., $t_C = -60°$ C.
Solvent in circulating system: 400 kg. per 100 m.$^3$ (S.T.P.) cracked gas.

The inert gases comprise hydrogen, carbon monoxide and nitrogen.

The process must be carried out in 3 stages, because the solubility of carbon dioxide lies between that of acetylene and ethylene, so that this gas must be recovered in as pure a state as possible in order to avoid losses.

The average yield per 100 m.$^3$ (N.T.P.) cracked gas is:

7.8 m.$^3$ (S.T.P.) acetylene, which contains 0.1% $CO_2$ less than 0.05% ethylene, and 1,000 p.p.m. methane and inert gases.

3.8 m.$^3$ (S.T.P.) carbon dioxide containing 0.2% acetylene and 0.1% ethylene. The content of residual gas does not exceed 1,000 p.p.m.

7.9 m.$^3$ (S.T.P.) ethylene contaminated by 0.1% carbon dioxide, 0.01% methane and less than 0.01% inert gas.

Example 2

In the recovery of ethylene, propylene and higher hydrocarbons from a cracked propane gas mixture with the average composition

| | $C_4$ and higher saturated hydrocarbons | Propylene | Ethylene | Methane | Hydrogen |
|---|---|---|---|---|---|
| Components | A | B | C | Residual gas | |
| Volume percent | 9 | 28.5 | 25.5 | 25 | 12 | and employing dimethyl formamide as the solvent, the folowing were the conditions existing at each stage:

Pressure in the absorbers 5, 7 and 9: 10.0 atm. abs.
Pressure in scrubber 10: 7.5 atm. abs.
Pressure in scrubber 15: 4.5 atm. abs.
Pressure in scrubber 20: 2.0 atm. abs.
Temperatures: $t_A = -7°$ C., $t_B = -22°$ C., $t_C = -54°$ C.
Solvent in circulating system: 1.15 m.$^3$ per 100 m.$^3$ (S.T.P.) cracked gas.

The approximate yield per 100 m.$^3$ (S.T.P.) cracked gas is:

9 m.$^3$ (S.T.P.) $C_4$ fraction contaminated by 2% propylene;

28 m.$^3$ (S.T.P.) propylene with a propylene content of 99%; balance propane and $C_4$ hydrocarbons;

25 m.$^3$ (S.T.P.) ethylene with a purity of 98.5%; balance propane and ethane.

Example 3

In the recovery of butadiene 1–3 (component A), butene-2 (component B), butene-1 (component C) and methyl propylene (component D) from a gas mixture with the average composition

|  | A | B | C | D | Inert gas |
|---|---|---|---|---|---|
| Volume percent | 22 | 13 | 8.5 | 5.5 | 51.0 | using N-methylpyrrolidone as solvent, the following were the conditions existing at the individual stages:

Pressure in the absorbers at all stages: 1.5 atm. abs.
Pressure in the scrubbers at all stages: 1.25 atm. abs.
Temperatures: $t_A = 12.3°$ C., $t_B = 7.2°$ C., $t_C = 7.5°$ C., $t_D = 16.6°$ C.
Solvent in circulating system: 3 m.³ per 100 m.³ (S.T.P.) crude gas.

The four components separated were obtained in a purity of 96% each.

In this process, the residual gas was not collected, but, in each case, it was led back from the scrubber direct to the gas inlet of the absorber connected thereto as indicated in FIG. 2.

Since the temperatures to be maintained in the individual absorbers are more or less similar, the solvent, after desorption of the more difficultly soluble component, must be led into the absorber for the next more readily soluble component without heat exchange with fresh solvent. These modifications compared with the arrangement shown in the drawing, are necessary because of the small differences between the solubilities of the components being separated.

We claim:

1. A multistage process for the separation and recovery of components from a feed gas mixture by fractional absorption in a solvent and subsequent desorption, which process comprises; passing the gas mixture directly through at least two absorption zones arranged in series, said series of absorption zones including at least a first and a last absorption zone; contacting said gas mixture in each of said absorption zones with a countercurrently flowing solvent, the temperature and pressure in each absorption zone being maintained to completely absorb in said solvent and remove from said gas stream one of the gaseous components to be separated and recovered with only partial absorption in said solvent of one of the remaining more difficultly soluble gaseous components; recovering part of the completely absorbed gaseous component from each absorption zone by passing the solvent therefrom into a two-stage desorption zone consisting of (1) a countercurrent scrubbing zone wherein the solvent is first stripped with a portion of the component being recovered in order to remove from said solvent the partially absorbed more difficultly soluble component, and (2) a degassing zone wherein the component to be recovered is at least partially liberated from the solvent by reducing the pressure and is withdrawn from said degassing zone as recovered product, there being a single absorption zone associated with a two-stage desorption zone for each component to be separated and recovered; leading the degassed solvent from each two-stage desorption zone into the next preceding absorption zone, the degassed solvent from the two-stage desorption zone associated with the first absorption zone being recycled to the last absorption zone after first being regenerated by removing therefrom substantially all of the gaseous component which is partially recovered in said first desorption zone, whereby said solvent is conducted in a single closed circuit countercurrently to the flow of gaseous components in each of said absorption and desorption zones.

2. A process as claimed in claim 1 wherein the gas removed from each countercurrent scrubbing zone is recycled and mixed with said feed gas mixture.

3. A process as claimed in claim 1 wherein the gas removed from each countercurrent scrubbing zone is recycled back from the scrubbing zone directly to the gas inlet of the absorber associated with said scrubbing zone.

4. A process as claimed in claim 1 wherein the gaseous mixture consists essentially of hydrocarbon cracking products containing acetylene ad ethylene to be separately recovered from each other and from the remaining gaseous components.

5. A process as claimed in claim 1 wherein the gaseous mixture consists essentially of hydrocarbon cracking products containing propylene and ethylene to be separated from each other and from the remaining gaseous components.

6. A process as claimed in claim 1 wherein the gaseous mixture consists essentially of 1,3-butadiene, butene-2, butene-1, methyl propylene and inert gases to be separated from each other.

References Cited by the Examiner

UNITED STATES PATENTS

| 1,768,521 | 6/1930 | Ayres | 55—48 |
| 2,237,386 | 4/1941 | Carney | 55—38 |
| 2,299,830 | 10/1942 | Legatski et al. | 55—48 X |
| 2,451,136 | 10/1948 | Wenzke | 55—40 |
| 2,608,270 | 8/1952 | McDonald et al. | 55—44 |
| 2,757,754 | 8/1956 | Natta | 55—44 |
| 2,773,560 | 12/1956 | Kohl et al. | 55—44 |
| 2,791,290 | 5/1957 | Natta | 55—44 |
| 2,806,552 | 9/1957 | Koble | 55—51 X |

REUBEN FRIEDMAN, *Primary Examiner.*